(12) United States Patent
Yu et al.

(10) Patent No.: US 10,467,191 B1
(45) Date of Patent: Nov. 5, 2019

(54) LARGE SCALE DATA JOIN SERVICE WITHIN A SERVICE PROVIDER NETWORK

(71) Applicant: Amazon Technologies, Inc., Seattle, WA (US)

(72) Inventors: Wei Yu, Sammamish, WA (US);
Nengwu Zhu, Sammamish, WA (US);
Hyen Vui Chung, Bellevue, WA (US);
Qihui Lee, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 176 days.

(21) Appl. No.: 15/391,714

(22) Filed: Dec. 27, 2016

(51) Int. Cl.
*G06F 16/00* (2019.01)
*G06F 16/13* (2019.01)
*G06F 16/2455* (2019.01)

(52) U.S. Cl.
CPC .......... *G06F 16/13* (2019.01); *G06F 16/2456* (2019.01); *G06F 16/24554* (2019.01)

(58) Field of Classification Search
CPC ............. G06F 12/0842; G06F 12/0864; G06F 17/30486; G06F 12/0848; G06F 17/30463; G06F 21/6218; G06F 21/6227; G06F 9/50; G06F 9/5005; G06F 9/5038; G06F 9/5077; G06F 11/0712; G06F 12/0802; G06F 12/0804; G06F 12/1036; G06F 12/1045; G06F 9/4555; G06F 9/45558; G06F 11/1474; G06F 11/1484; G06F 12/109; G06F 17/10; G06F 17/30315; G06F 17/30321; G06F 9/3826; G06F 17/30324; G06F 17/30442; G06F 17/30592; G06F 17/30598; G06F 2009/45583; G06F 2212/604; G06F 7/582; G06F 7/588; G06F 9/5016; G06F 11/1076; G06F 11/1451; G06F 11/1466; G06F 12/0276; G06F 12/0607; G06F 12/084; G06F 12/0846; G06F 12/1009; G06F 12/1027; G06F 12/126; G06F 9/3834; G06F 9/455; G06F 9/5011; G06F 12/1408; G06F 12/1425; G06F 15/8007; G06F 17/30312; G06F 17/30333; G06F 17/30501; G06F 17/30516; G06F 17/30551; G06F 17/30554; G06F 17/30693; G06F 17/30864;
(Continued)

(56) References Cited

U.S. PATENT DOCUMENTS 6,216,125 B1 * 4/2001 Johnson ............ G06F 17/30324
7,254,580 B1 * 8/2007 Gharachorloo ... G06F 17/30545
(Continued)

*Primary Examiner* — Yicun Wu
(74) *Attorney, Agent, or Firm* — Lee & Hayes, P.C.

(57) ABSTRACT

Technologies are disclosed for providing a large scale data join service within a service provider network. A data set includes first and second sets of files that correspond to each other. Each file includes a first identifier (ID) and a second ID. The first set of files is partitioned based at least in part upon the first ID into a plurality of first subsets of files and the second set of files is partitioned based at least in part upon the first ID into a plurality of second subsets of files. Files within a first group of the plurality of first subsets and files within a second group of the plurality of second subsets are encoded into first and second bitsets, respectively, based at least in part upon the second IDs. An exclusive-or operation is performed on the first and second bitsets to find discrepancies between the data files.

20 Claims, 9 Drawing Sheets

(58) Field of Classification Search
CPC ......... G06F 17/30908; G06F 17/30988; G06F 2009/45579; G06F 2212/452; G06F 2212/652; G06F 3/0607; G06F 3/061; G06F 3/0635; G06F 3/064; G06F 3/0661; G06F 3/0664; G06F 3/067; G06F 9/30036; G06F 9/3824
See application file for complete search history.

(56) References Cited

U.S. PATENT DOCUMENTS

| | | | |
|---|---|---|---|
| 10,162,842 B2* | 12/2018 | Ross | G06F 17/30321 |
| 2013/0084018 A1* | 4/2013 | Nystad | G06K 9/36 |
| | | | 382/232 |
| 2013/0101046 A1* | 4/2013 | Korodi | H04N 19/1883 |
| | | | 375/240.18 |

* cited by examiner

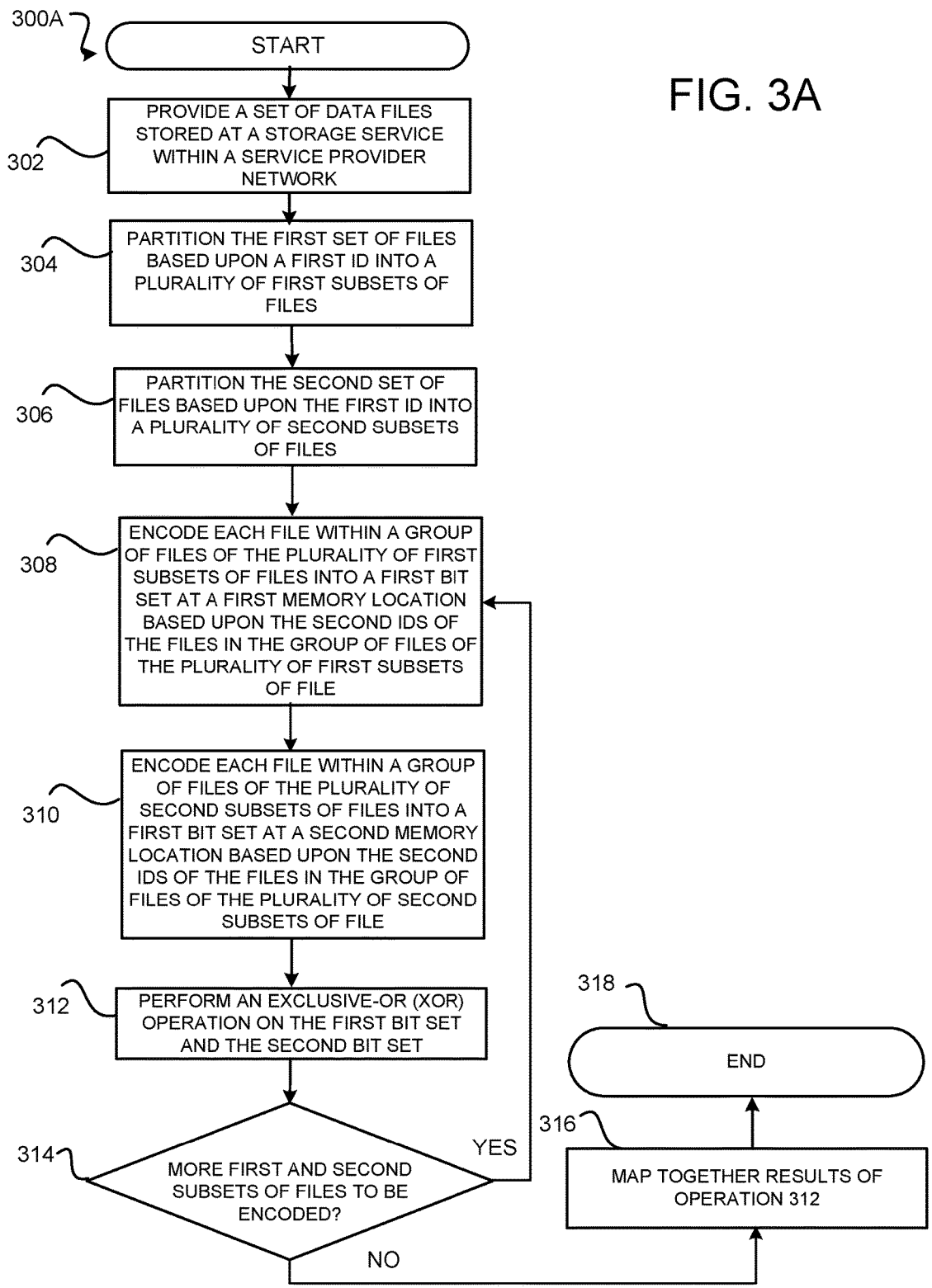

LARGE SCALE DATA JOIN SERVICE WITHIN A SERVICE PROVIDER NETWORK

BACKGROUND

Certain types of data can be stored in a manner that includes two sets of corresponding data files. A first set of data files includes object content files that contain the object content itself, while the second corresponding set of data files includes index files related the object content files. The index files can also include associated metadata related to the object content files.

It is desirable to try to ensure that the object content files and the index files are consistent to and correspond with one another. In other words, it is desirable to know if an index file exists when there is no corresponding object content file in the first set of data files. Likewise, it is desirable to determine if an object content file exists that has no corresponding index data file in the second set of data files. If either situation exists, this can be an indication of corrupted data.

In order to determine if either scenario exists, and in an attempt to ensure that the sets of data files are consistent and correspond with one another, the first set of data files may be compared with the second set of data files. One way in which to compare the two sets of data files may include performing a type of data join operation where it is determined if the two sets of data files have an intersection where only one data file is present within either set of data files, e.g., an anti join operation of the two sets of data files. However, there may be billions or even trillions of data files. Thus, such an anti join operation may take weeks or even months to complete the task. Such an operation might also require allocation of large amounts of memory, which might require garbage collection in certain configurations. Garbage collection can utilize large amounts of CPU time and, therefore, negatively affect performance.

Additionally, some data joins and anti joins may be performed where the data files are partitioned into subsets of data files. Such partitioning may be performed based upon a partitioning key. However, if the key is relatively very large with respect to the number of files, then the partitioning of the data files may not result in insufficiently small subsets of data files on which to perform data join or data anti-join operations.

The disclosure made herein is presented with respect to these and other considerations.

BRIEF DESCRIPTION OF THE DRAWINGS

FIGS. 3A and 3B are flow diagrams showing routines that illustrate aspects of operations performed by the data join service of the service provider network arrangements of FIGS. 1A-2B in order to perform large scale data joins, according to configurations;

DETAILED DESCRIPTION

Figure 1A:
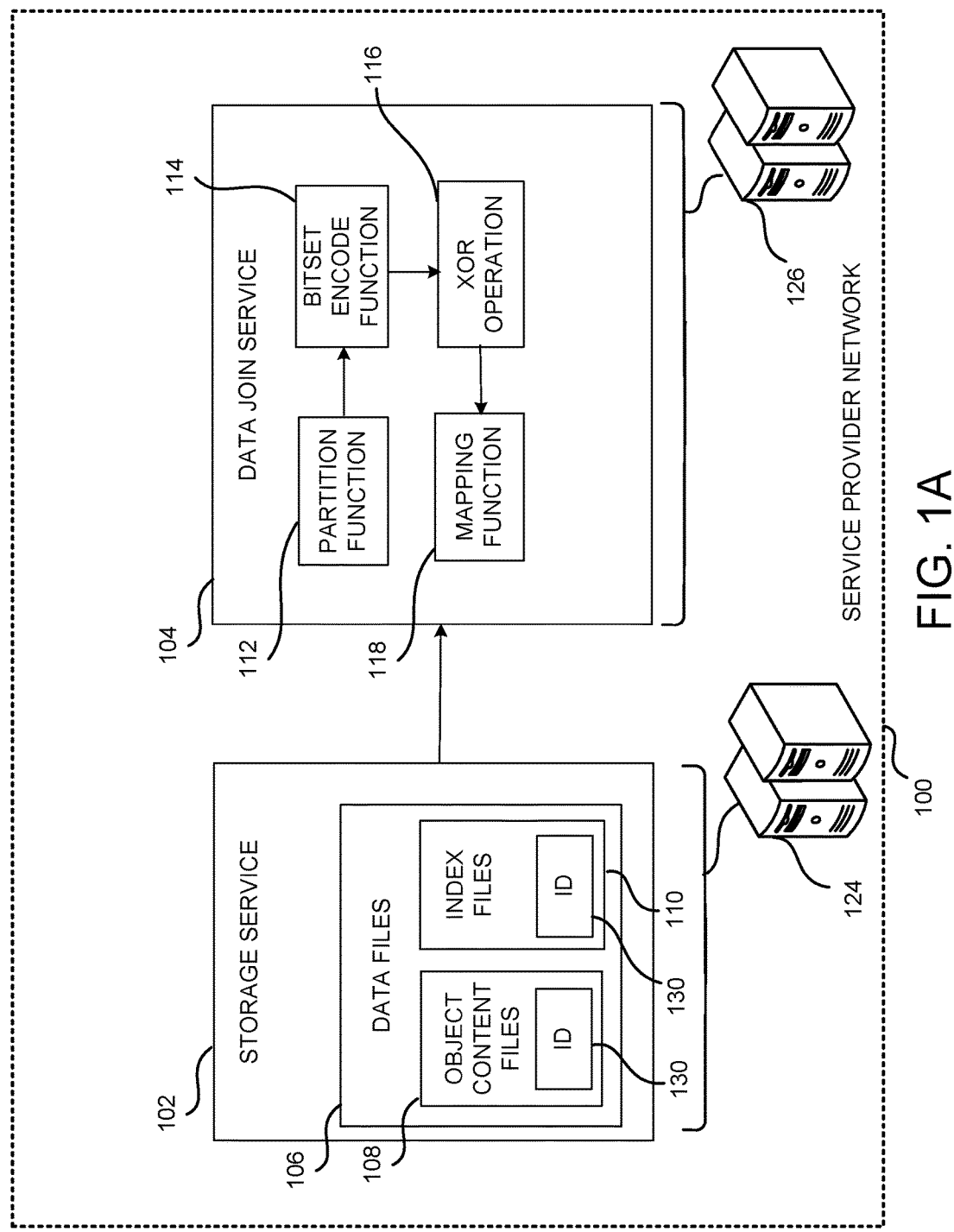
FIGS. 1A and 1B schematically illustrate a service provider network that provides various services to users including a storage service and a data join service, according to configurations.

The following detailed description is directed to technologies for performing large scale data joins and anti joins of billions and even trillions of data files. An implementation of the technologies described herein can improve the speed with which large scale data joins and anti joins may be performed. The data files to be joined or anti joined may be partitioned into subsets of data files based at least in part upon a first identifier (ID). The files within the subsets may then be bitset encoded based at least in part upon a second ID and compared with one another to determine discrepancies among the data files. The bitsets may be stored into pre-allocated memory locations that may be reused for subsequent bitset encoding of subsets of data files. This functionality can reduce processing time and the use of computational resources, as well as memory resources, as compared to previous solutions. Furthermore, this functionality utilizes a much lower allocation of amounts of memory, and thus avoids garbage collection in comparison to previous solutions. Accordingly, this functionality can utilize lower amounts of CPU time and therefore improve overall performance. Technical benefits other than those specifically identified herein might also be realized through an implementation of the disclosed technologies.

In accordance with various configurations, a data storage service operating in a service provider network can be utilized to store data files. The data files may include object content files that include object content and index files that store data relating to the identification of locations within the storage service where the object content files are stored. The index files may also store associated metadata for the objects. Thus, the object content data files correspond with the index data files.

In accordance with configurations, the object content files and the associated index data files may each include an overall ID. The overall ID may include two parts in the form of a first ID and a second ID. In configurations, the first ID can be a volume ID and the second ID can be an item ID. Generally, each object content data file and each index data file may have the same volume ID, but each object data file and each corresponding index data file have a unique item ID. Thus, multiple object content data files and the corresponding index data files may have the same volume ID, but within each set of data files having the same volume ID, each object content data file and its corresponding index data file have a unique item ID.

In order to determine if an object content file exists but no corresponding index file exists, and vice versa, in configurations a comparison of the object content files may be performed with the index files. Since there can be billions and even trillions of object content files, and thus, billions and even trillions of corresponding index files, the object content files may be partitioned using the first ID, e.g., the volume ID, as a partitioning key. Likewise, the index files may also be partitioned based at least in part upon the first ID, e.g., the volume ID. Since multiple data files can have the same volume ID, this results in partitioning the object content files and their corresponding index files into smaller groups or subsets of data files, e.g., millions of partitioned subsets of data files.

The overall ID generally has a fixed size. In configurations, the size of the overall ID is pre-allocated as half for the first ID and the other half for the second ID. In a configuration, two pre-allocated memory locations may be pre-allocated within a computer system executing a data join service based at least in part upon the size of the second ID. For example, if the overall ID size is two bytes, then the two pre-allocated memory locations may each have a size of one byte, which corresponds to the size of the second ID, e.g., the item ID. By using the second ID size, smaller amounts of memory may be used for the pre-allocated memory locations.

The second IDs of object content files and index files of a subset of data files may then be encoded into two bitsets. In this example, the pre-allocated memory locations are equal to 32 bytes or 256 bits. In order to encode the object content files and index files into bitsets, the second IDs for each file are evaluated. For example, if an object content file has an item ID of five, then the bitset in one of the pre-allocated memory locations (for the object content files) bitset may have its fifth bitset to one to indicate that an object content file identified as five is present in the object content files of the subset of data files.

Such encoding is performed for all of the object content files where the bit representing the item ID is set to one. For example, if an object content file exists and has an item ID of 200, then the 200th bit of the 256 bits is set to one. Such encoding is also performed for the index files of the subset of data files based at least in part upon the second ID.

At the other pre-allocated memory location within the computer system executing the data join service for the index files, 256 bits may be pre-allocated based at least in part upon the size of the second ID. The index files are evaluated with respect to the second IDs as previously discussed with respect to the object content files. For example, if an index file exists and has an item ID of 200, then the 200th bit of the 256 bits is set to one.

Once the object content files of a partitioned subset of data files have been encoded into a bitset and the corresponding index files have been encoded into a second bitset, the two bitsets may be compared. In configurations, the comparison can be performed as an anti-join, e.g., a logical exclusive OR (XOR) operation, in order to determine if a bit in either bitset does not match up with a corresponding bit in the other bitset. This can indicate that an object file exists without a corresponding index file, and vice versa.

In configurations, partitioning of the data files within a set of data files may not result in partitioning of the data files into smaller, more manageable subsets of data files. For example, if the partitioning key, e.g., the first ID or volume ID, is very, very large with respect to the second ID, e.g., the item ID, then partitioning of the data files may not reduce the number of data files from the billions or trillions down into subsets of data files that include only millions of data files.

Thus, in configurations, the object content files may be partitioned based at least in part upon the second ID to provide an intermediate subset of object content files. The intermediate subset of object content files may then be anti joined with the index files, i.e., perform a logical XOR operation between the intermediate subset of object content files and the index files of the set of data files to determine files that exist in the intermediate subset of object content files but not in the index files and vice versa.

The results of the anti join operation may then be stored by the storage service. The results of the anti join operation can then be joined, i.e. perform a logical OR operation, with the complete set of object content files in order to retrieve the partitioning key, e.g., the first ID for the data files in the results of the anti join operation.

In configurations, the joining of the results of the anti join operation with the complete set of object content files can be performed utilizing a streaming hash join to get the file result. Additional details regarding the various components and processes described above for performing large scale data joins of billions and even trillions of data files within a service provider network will be presented below with regard to FIGS. 1-6.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable electronic devices, minicomputers, mainframe computers, handheld computers, personal digital assistants, e-readers, cellular telephone devices, special-purposed hardware devices, network appliances, and the like. The configurations described herein can also be practiced in distributed computing environments, where tasks can be performed by remote computing devices that are linked through a communications network. In a distributed computing environment, program modules can be located in and executed from both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1A schematically illustrates a service provider network 100 that includes a storage service 102 and a data join service 104. The storage service 102 includes multiple locations that store sets of data files 106. Each set of data files 106 includes object content files 108 and corresponding index files 110. The object content files 108 store the actual object content of the data files 106, while the index files 110 store the location of the object content files 108 in the storage service 102, along with associated metadata of the object content files 108.

In order to help ensure that the data files 106 are not corrupted, e.g., that an object content file 108 includes a corresponding index file 110 (and vice versa) in configurations, the data join service 104 evaluates the object content files 108 and the corresponding index files 110 of the sets of data files 106. As will be discussed further herein, since the total number of data files 106 may be in the trillions, in configurations, a partition function 112 partitions the data files into subsets of data files 106 based upon a partitioning key. In configurations the partitioning key may be part of the ID 130.

The subsets of data files 106 are then encoded with an encoding function 114 into bitsets. As is known, a bitset is an array data structure that compactly stores bits. A bitset for a subset of object content files 108 is then compared with a bitset of the corresponding index files 110 of the subset of data files 106. In configurations, the comparison is an anti join operation in the form of a logical exclusive OR (XOR) operation 116. The XOR operation 116 may indicate if an object content file 108 exists in the subset 112 of data files without a corresponding index data file 110, and vice versa. The results of the XOR operation 116 for the different partitioned subsets 112 of data files 106 can then be mapped together with a mapping function 118 to provide an overall assessment of the data files 106 stored within the storage service 102.

Figure 1B:
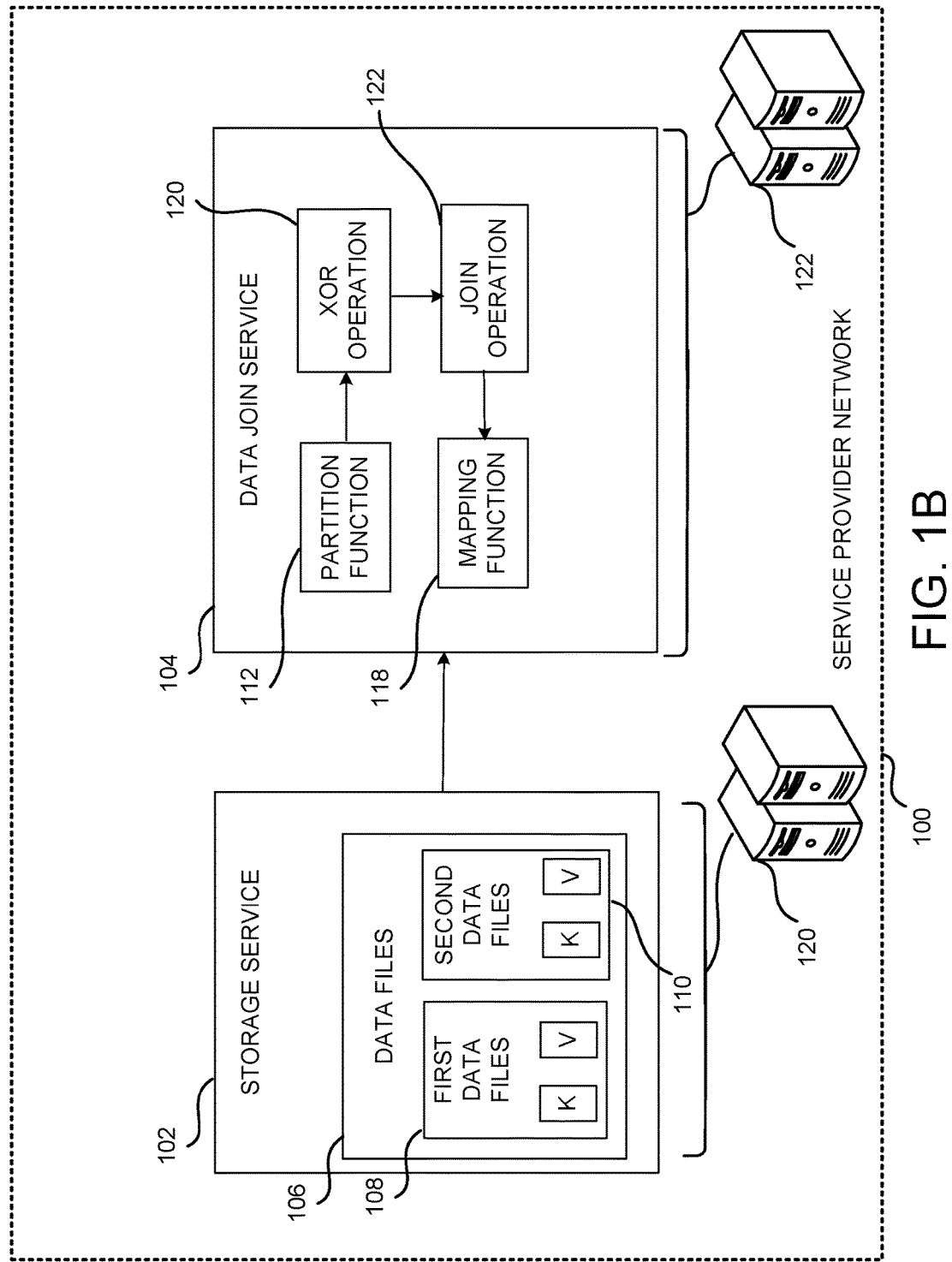

FIG. 1B illustrates another configuration of data join service 104 within the service provider network 100. As previously noted, the storage service 102 includes multiple locations that store sets of data files 106. Each set of data files 106 includes a first set of data, e.g., object content files 108 and a corresponding second set of data files, e.g., index files 110. The object content files 108 store the actual object content of the data files 106 while the index files 110 store the location of the object content files 108 in the storage service 102, along with associated metadata of the object content files 108.

As will be discussed further herein, in configurations each object content file 108 includes two attributes, K and V. Likewise, each index file 110 includes two attributes, K and V. In configurations, if the attribute K is relatively very, very large in comparison to the attribute V, the object content files 108 may be partitioned by the partition function 112 of the data join service 104 based upon the attribute V to provide an intermediate set of object content files 108.

The intermediate set of object content files 108 may be joined by an anti-join operation 120 of the data join service 104 with the index files 110 to provide an initial set of final results. In configurations, the anti join function 120 may be a logical XOR operation that indicates of the existence of files in the intermediate set of object content files 108 but not in the the index files 110 based upon the attribute V, and vice versa.

In order to obtain the attribute K for the files of the XOR operation 120, the initial set of final results may be joined via a logical OR operation 122 with the complete set of object content files 108 to determine a set of intersecting files based upon the attributes K and V within the object content files 108 and the index files 110. The joining of the initial set of final results with the complete set of object content files 108 may be performed using a streaming hash join with the complete set of object content files 108. The results may then be mapped using the mapping function 118 of the data join service 104. The results may also be stored in the storage service 102, or some other storage location, and/or may be analyzed by some other service of the service provider network 100.

In configurations, one or more hosts 124, e.g., servers, may provide the storage service 102, while one or more hosts 126, e.g., servers, may provide the data join service 104. In configurations, the storage service 102 and the data join service 104 may be provided by the same hosts 124 and/or 126. Multiple hosts 126 and multiple portions of hosts 126 may be utilized to perform the various operations of the data join service 104 on sets of data files 106 in parallel.

Figure 2A:
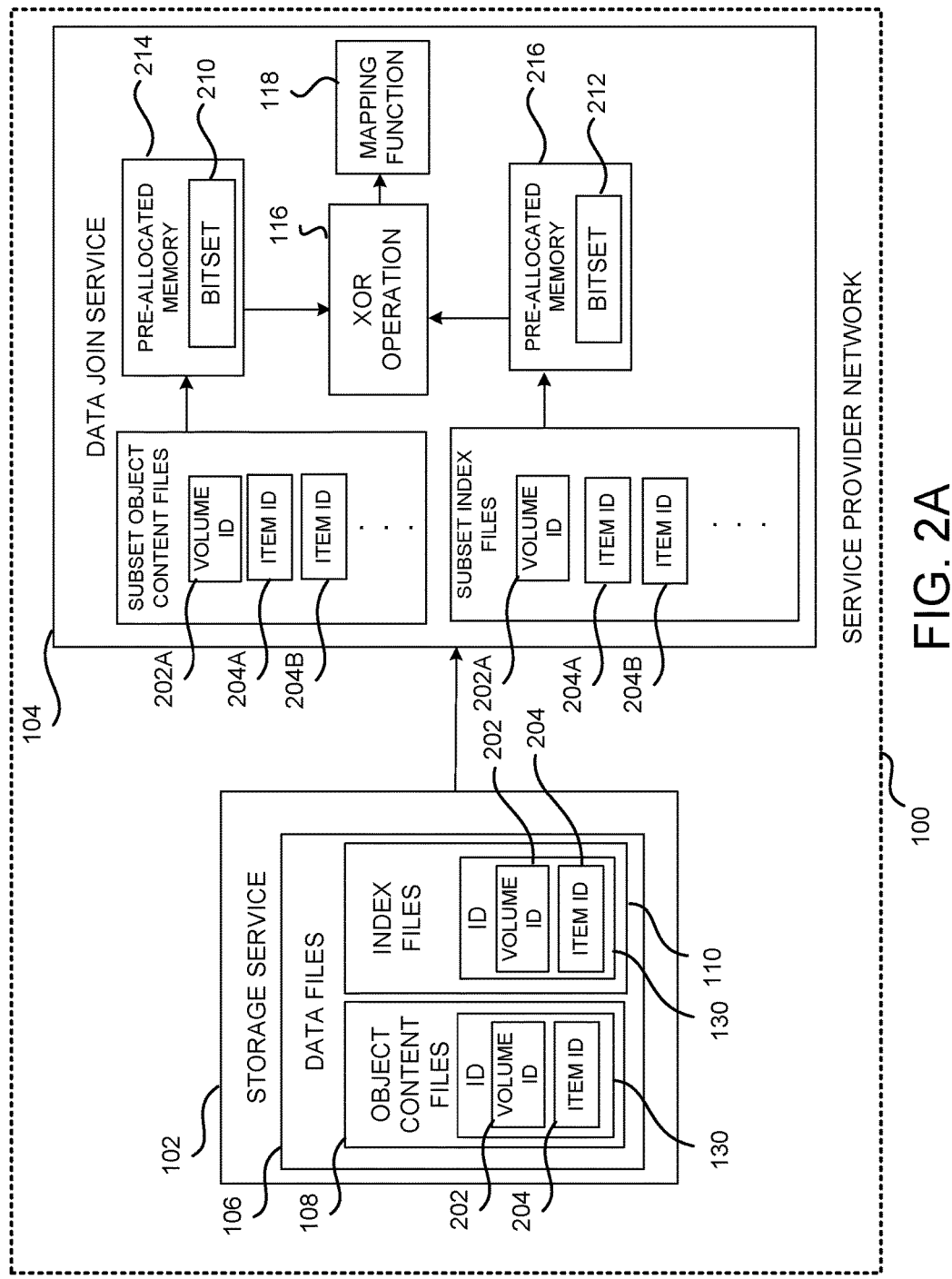
FIGS. 2A and 2B schematically illustrate aspects of the configuration and operation of the storage service and the data join service operating within the service provider network of FIGS. 1A and 1B, according to configurations.

FIG. 2A schematically illustrates the storage service 102 of the service provider network 100 and the data join service 104 of the service provider network 100 of FIG. 1A in greater detail. As discussed above, each data file 106 includes an object content file 108 and an index file 110. Each object content file 108 includes an overall ID 130 that includes a first ID, which in configurations may be a volume ID 202, which may identify a volume or group of files, and a second ID, which in configurations may be an item ID 204, which may identify each individual file within the volume of files. Likewise, each corresponding index file 110 includes an overall ID 130 that includes a first ID, which in configurations may be a volume ID 202, which may identify a volume or group of files, and a second ID, which in configurations may be an item ID 204, which may identify each individual file within the volume of files.

As previously noted, the object content files 108 and the corresponding index files 110 may be partitioned by the partition service 112 of the data join service 104 into partitioned subsets 206 of object content files 108 and partitioned subsets of index files 110 based upon a partitioning key. In configurations, the partitioning key may be the volume IDs 202.

A partitioned subset of object content files 206A will then all have a common volume ID 202, but will have different item IDs 204A, 204B, etc. For example, a partitioned subset 206A of object content files 108 that has been partitioned based upon a first volume ID 202a will have multiple object content files 108 that all include the same first volume ID 202a, but each have a unique item ID 204a, 204b, etc. Correspondingly, a partitioned subset 206B of index files 110 that has been partitioned based upon the first volume ID 202A will have multiple index files 110 that all include the same first volume ID 202a but each have a unique item ID 204A, 204B, etc.

In configurations, the item IDs 204 of the object content files 108 of the subset 206A of object content files 108 may be encoded into a bitset 210. Likewise, the index files 110 of the subset 206B of index files 110 may be encoded into a bitset 212. The overall ID 130 generally has a fixed size.

In configurations, the size of the overall ID 130 is pre-allocated as half for the volume ID 202 and the other half for the item ID 204. In a configuration, two pre-allocated memory locations 214, 216 may be pre-allocated for the two bitsets 210, 212 within the data join service 104 based upon the size of the item ID 204. For example, if the size of the overall ID 130 is two bytes, then the two pre-allocated memory locations 214, 216 within the data join service 104 may each have a size of one byte, which corresponds to the size of the item ID 204. By using the item ID size 204, smaller amounts of memory may be used for the pre-allocated memory locations 214, 216.

In this example, the pre-allocated memory locations 214, 216 are equal to one byte or 256 bits. In order to encode the object content files 108 and the index files 110 into the respective bitsets 210, 212, the item IDs 204 for each file are evaluated. For example, if an object content file 108 has an item ID 204 of five, then the bitset 210 in the pre-allocated memory location 214 may have the fifth bit of the bitset 210 set to one to indicate that an object content file 108 identified as five is present in the subset 206A of the object content files 108.

Such encoding is performed for all of the object content files 108 with the bit representing the item ID 204 being set to one. For example, if an object content file 108 exists and has an item ID of 157, then the 157$^{th}$ bit of the 256 bits of the bitset 210 is set to one in the pre-allocated memory location 214.

Such encoding is also performed for the index files 108 of the subset 206B of index files based upon the item ID 204 to provide the bitset 212 stored at pre-allocated memory location 216. Thus, at the pre-allocated memory location 216 within a computer system executing the data join service 104, 256 bits may be pre-allocated based upon the size of the item ID 204. The index files 110 of the subset 206B of index files 108 are evaluated with respect to the item IDs 204 as previously discussed for the object content files 108. For example, if an index file 108 exists within the subset 210 of index files 108 and has an item ID 204 of 137, then the 137$^{th}$ bit of the 256 bits is set to one in the bitset 212 in the pre-allocated memory location 216.

Once the object content files 108 of the partitioned subset 206A of object content files 108 have been encoded into the bitset 210 and the index files 108 of the partitioned subset 206B of index files 110 have been encoded into the second bitset 212, the two bitsets 210, 212 may be compared. In configurations, the comparison can be performed as an anti join function using the logical exclusive OR (XOR) operation 116 in order to determine if a bit in either bitset 210, 212 does not match up with a corresponding bit in the other bitset 210, 212.

In configurations, other forms of comparison may be used. This can indicate that an object file 108 exists in the subset 206A without a corresponding index file 110 in the subset 206B, and vice versa. For example, if the bitset 210 has a 1 in the fifth bit of the pre-allocated memory location 214 but the bitset 212 has a 0 in the fifth bit of the pre-allocated memory location 216, this indicates that the subset 206A of object content files includes an object content file 108 with an item ID 204 of 5 but the subset 206B of index files 110 does not include a corresponding index file 110 with an item ID 204 of 5.

Once the XOR operation 116 is complete with respect to the partitioned subsets 206A, 206B based upon the first volume ID 202A, the process may be repeated with respect to another volume ID 202. During the bitset encoding of the subsets 206 of object files 108 and index files 110, the pre-allocated memory locations 214, 216 may be reused. Once the data files 106 have all been partitioned based upon all of the volume IDs 202 and all subsets 206 of object files 108 and index files 110 have been bitset encoded and anti joined with the XOR operation 116, the results of the XOR operation 116 for the various partitioned subsets 206 of data files 106 can then be mapped together with the mapping function 118 to provide an overall assessment of the data files 106 stored within the storage service 102.

Figure 2B:
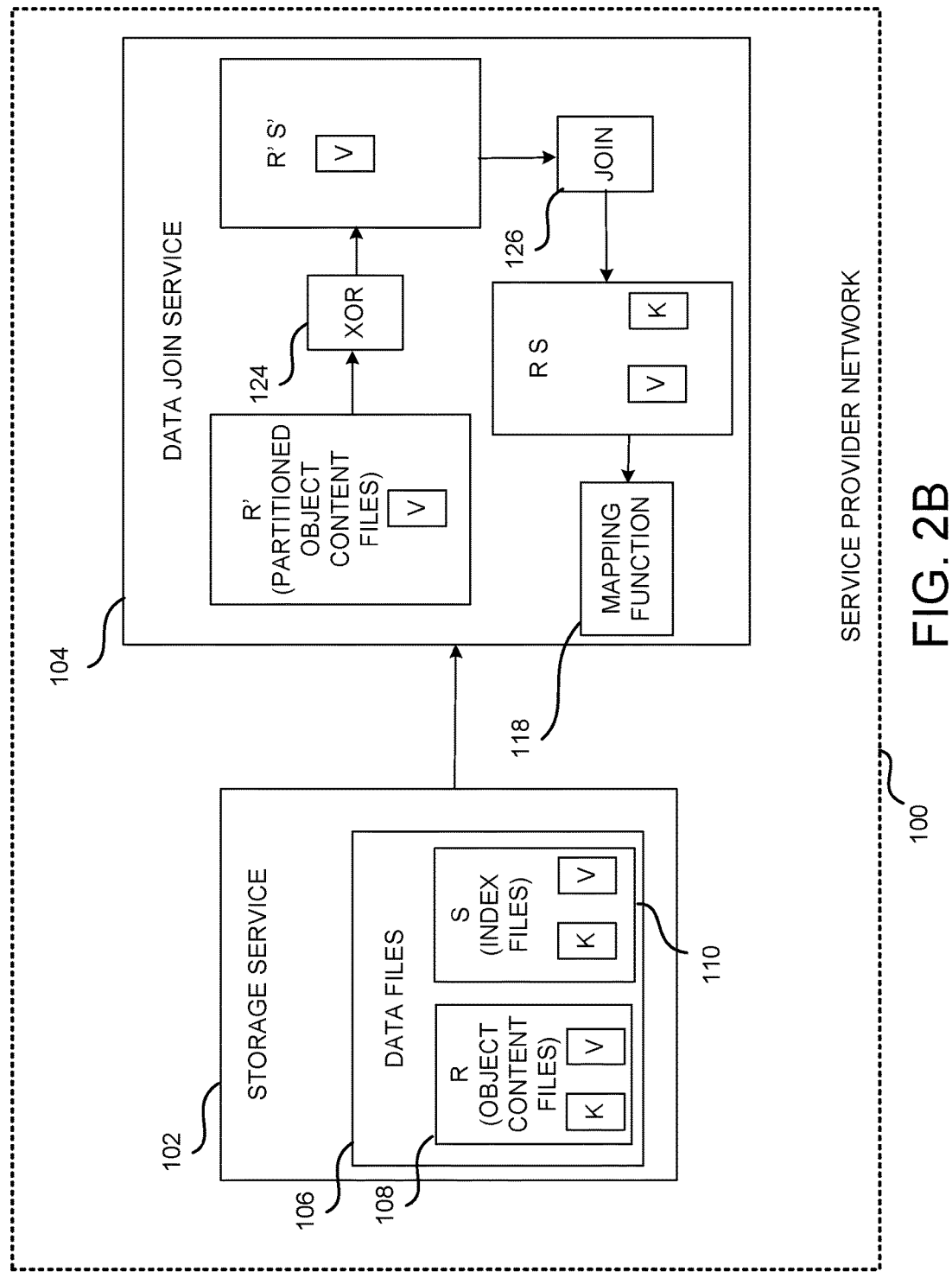

FIG. 2B schematically illustrates the configuration of the storage service 102 and data join service 104 of FIG. 1B in greater detail. Data files 106 include a first set R of data files, e.g., object content files 108 and a second set S of corresponding data files, e.g., index files 108. Each object content file 108 includes a first attribute, e.g. a customer key K that identifies a customer that the data files belong to and a second attribute, e.g., an index V, which may be a volume ID. In configurations, the customer key is relatively very, very large with respect to the index V.

In configurations, the data join service 104 partitions the set R of object content files 108 into an intermediate set R' based upon the index V. The partitioned intermediate set R' may then be anti joined using the logical XOR operation 120 with the set S of index files 110 to provide a second intermediate set R'S' in order to determine object content files 108 within R' that include V but corresponding index files 110 in the set S do not include V, and vice versa. The second intermediate set R'S' may be relatively small and may be loaded into memory within the data join service 104.

A join operation 122 may be performed joining the second intermediate set R'S' with the original set R of object content files 108 in order to obtain the common files of R and S that include attributes V and K. The joining of the second intermediate set R'S' with the set R of object content files 108 may be performed using a streaming hash join with the set R of object content files 108. The results may then be stored and/or analyzed. In configurations, the results may be mapped by mapping function 118.

As previously noted, the data join service 104 generally may be provided by a cluster of hosts 126 to perform the various operations. Thus, multiple partition operations, multiple encoding into bitset operations and multiple comparisons may be performed in parallel by multiple hosts 126 and/or on individual hosts. Likewise, while only two pre-allocated memory locations 214, 216 are described, multiple pre-allocated memory locations may be provided on the hosts 126 within the computer systems executing the data join service 104 to allow for parallel encodings into bitsets. Additionally, once a comparison has been performed and the results stored, the pre-allocated memory locations 214, 216 (as well as other pre-allocated memory locations) for the bitsets 210, 212 may be reused for further evaluating of other subsets 206 of partitioned data files 106.

It is to be appreciated that the examples given above are merely illustrative and that other techniques can be used in other configurations. Additional details regarding the arrangements shown in FIGS. 1A-2B will be provided below with respect to FIGS. 3A and 3B.

Figure 3B:
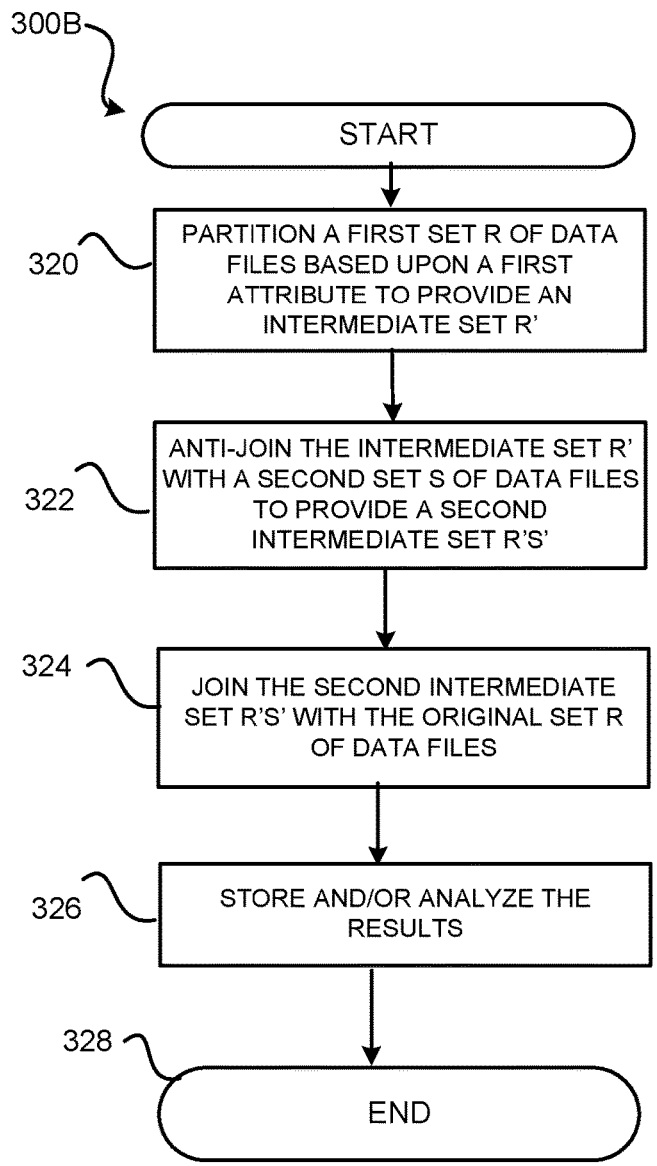

FIGS. 3A and 3B include flow diagrams showing routines 300A and 300B, respectively, that illustrate aspects of large scale data joining using a data join service, e.g. the data join service 104 of the service provider network 100 of FIGS. 1A-2B. It is to be appreciated that the logical operations described herein with respect to FIGS. 3A and 3B (and the other FIGS.) can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein.

Referring to FIG. 3A, the routine 300A begins at operation 302, where a set of data files, e.g., data files 106, stored at a storage service within the service provider network are provided. The set of data files includes a first set of files, e.g., object content files 108, and a second set of files, e.g., index files 110, that corresponds to the first set of files. Each file within both sets of files includes a first identifier (ID), e.g., volume ID 202, and a second ID, e.g., item ID. At operation 304, the first set of files is partitioned based upon the first ID into a plurality of first subsets of files.

From operation 304, the routine 300A continues to operation 306, where the second set of files is partitioned based upon the first ID into a plurality of second subsets of files. At operation 308, each file within a group of files of the plurality of first subsets of files is encoded into a first bitset at a first memory location based upon the second IDs of the files in the group of files of the plurality of first subsets of files. At operation 310, each file within a group of files of the plurality of second subsets of files is encoded into a second bitset at a second memory location based upon the second IDs of the files in the group of files of the plurality of second subsets of files.

From operation 310, the routine 300A continues to operation 312, where a logical exclusive-or (XOR) operation is performed on the first bitset and the second bitset. At operation 314, it is determined if more first and second subsets of files need to be encoded into bitsets. If yes, then the routine 300A returns to operation 308. If no, then the routine proceeds to operation 316 where the results of operation 312 may be mapped together. From operation 316, the routine 300A proceeds to operation 318, where it ends.

Referring to FIG. 3B, the routine 300B begins at operation 320 where a data service, e.g., data service 104 of the service provider network 100, partitions a first set R of data files, e.g., object content files 108, based upon a first attribute, e.g., attribute V, to provide an intermediate set R'. The first set R of data files may be stored in a storage service, e.g., storage service 102 of the service provider network 100.

At operation 322, the intermediate set R' is anti joined with a second set S of data files, e.g., index files 110 to provide a second intermediate set R'S' that includes the files of set R that are not included in set S that include the first attribute, and vice versa. The second set S of data files may be stored in a storage service, e.g., storage service 102 of the service provider network 100.

At operation 324, the second intermediate set R'S' may be joined with the original set R of data files in order to obtain the files of sets R that are not included in set S, and vice versa, that include the first attribute and a second attribute, e.g., attribute K. The joining of the second intermediate set R'S' with the set R of data files may be performed using a streaming hash join with the set R of data files.

At operation 326, the results may be stored and/or analyzed. From operation 326, the routine 300B proceeds to operation 328, where it ends.

Figure 4:
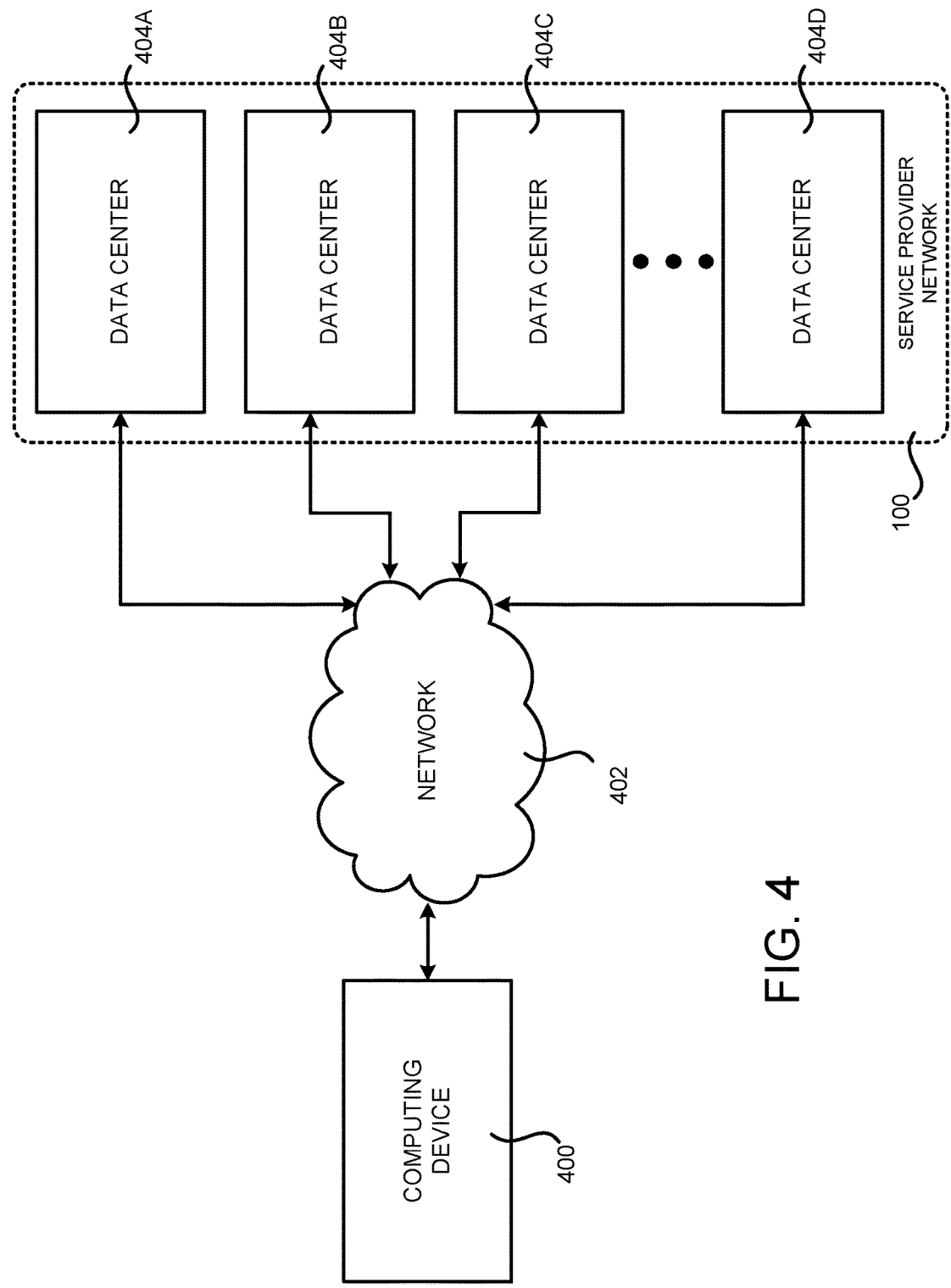
FIG. 4 is a system and network diagram that shows an illustrative operating environment that includes a service provider network that can be configured to implement aspects of the functionality described herein.

FIG. 4 is a system and network diagram that shows one illustrative operating environment for the configurations disclosed herein that includes a service provider network 100. As discussed above, the service provider network 100 can execute network services that provide computing resources on a permanent or an as-needed basis. Among other types of functionality, the computing resources provided by the service provider network 100 can be utilized to implement the various network services described herein. As also discussed above, the computing resources provided by the service provider network 100 can include various types of computing resources, such as data processing resources like VM instances, data storage resources, networking resources, data communication resources, network services, and the like.

Each type of computing resource provided by the service provider network 100 can be general-purpose or can be available in a number of specific configurations. For example, data processing resources can be available as physical computers or VM instances in a number of different configurations. The VM instances can be configured to execute applications, including Web servers, application servers, media servers, database servers, some or all of the network services described above, and/or other types of programs. Data storage resources can include file storage devices, block storage devices, and the like. The service provider network 100 can also be configured to provide other types of computing resources not mentioned specifically herein.

As also discussed above, the computing resources provided by the service provider network 100 are enabled in one implementation by one or more data centers 404A-404D (which might be referred herein singularly as "a data center 404" or in the plural as "the data centers 404"). The data centers 404 are facilities utilized to house and operate computer systems and associated components. The data centers 404 typically include redundant and backup power, communications, cooling, and security systems. The data centers 404 can also be located in geographically disparate locations. One illustrative configuration for a data center 404 that can be utilized to implement the technologies disclosed herein will be described below with regard to FIG. 5.

The customers and other users of the service provider network 100 can access the computing resources provided by the service provider network 100 over a network 402, which can be a wide area communication network ("WAN"), such as the Internet, an intranet or an Internet service provider ("ISP") network or a combination of such networks. For example, and without limitation, a computing device 400 operated by a customer or other user of the service provider network 100 can be utilized to access the service provider network 100 by way of the network 402. It should be appreciated that a local-area network ("LAN"), the Internet, or any other networking topology known in the art that connects the data centers 404 to remote customers and other users can be utilized. It should also be appreciated that combinations of such networks can also be utilized.

Figure 5:
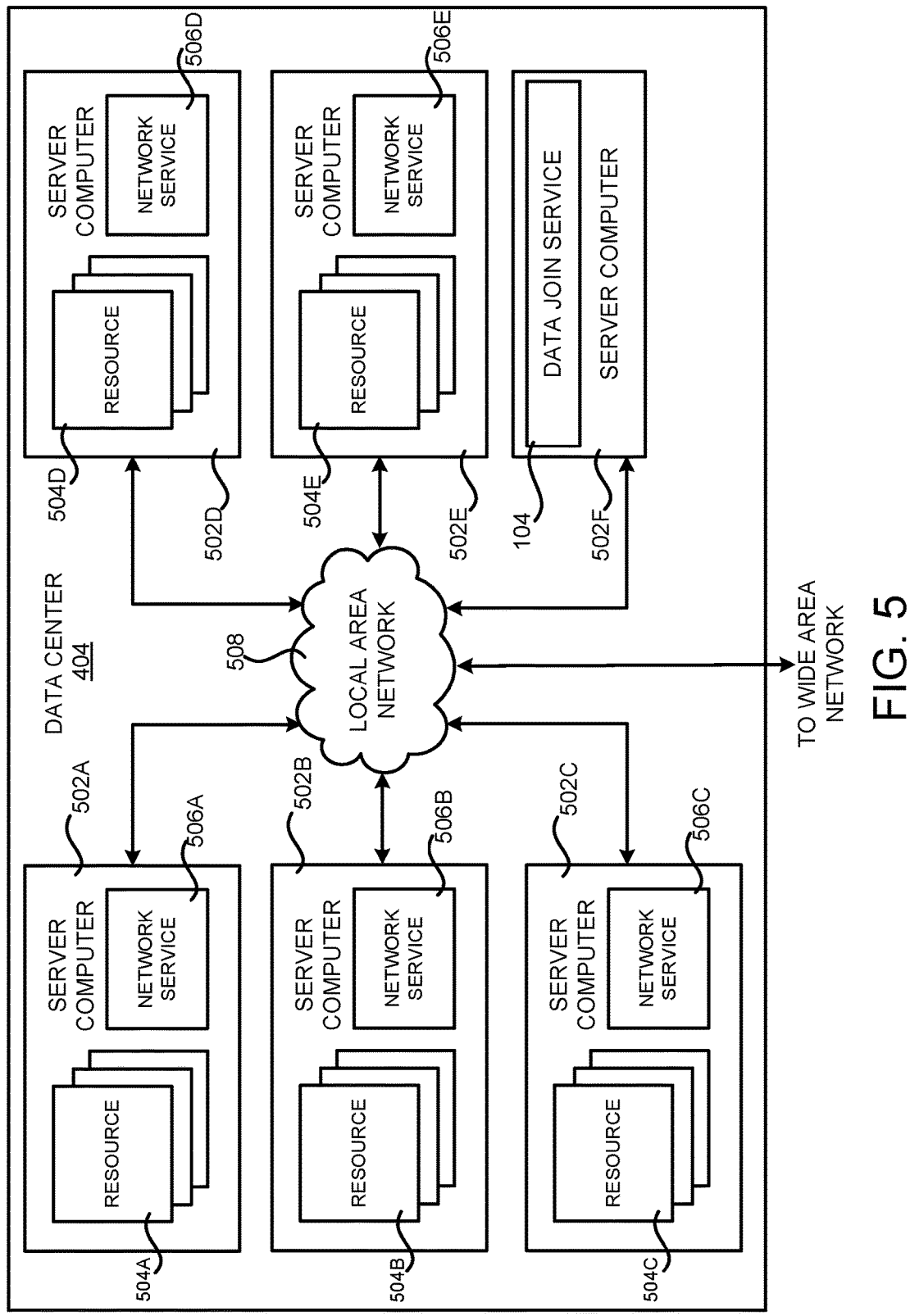
FIG. 5 is a computing system diagram illustrating a configuration for a data center that can be utilized to implement aspects of the technologies disclosed herein.

FIG. 5 is a computing system diagram that illustrates one configuration for a data center 404 that implements aspects of the technologies disclosed herein. The example data center 404 shown in FIG. 5 includes several server computers 502A-502F (which might be referred to herein singularly as "a server computer 502" or in the plural as "the server computers 502") for providing the computing resources 504A-504E.

The server computers 502 can be standard tower, rack-mount, or blade server computers configured appropriately for providing the computing resources 504 described herein (illustrated in FIG. 5 as the computing resources 504A-504E). As mentioned above, the computing resources 504 provided by the service provider network 100 can be data processing resources such as VM instances or hardware computing systems, data storage resources, database resources, networking resources, and others. Some of the servers 502 can also be configured to execute network services 506A-506E, respectively, capable of instantiating, providing and/or managing the computing resources 504.

The data center 404 shown in FIG. 5 also includes a server computer 502F that can execute some or all of the software components described above. For example, and without limitation, the server computer 502F can be configured to execute the data join service 104, which was described in detail above. The server computer 502F can also be configured to execute other components and/or to store data for providing some or all of the functionality described herein. In this regard, it should be appreciated that the services disclosed herein can execute on many other physical or virtual servers in the data centers 404 in various configurations.

In the example data center 404 shown in FIG. 5, an appropriate LAN 508 is also utilized to interconnect the server computers 502A-502F. The LAN 508 is also connected to the network 402 illustrated in FIG. 4. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 404A-404D, between each of the server computers 502A-502F in each data center 404, and, potentially, between computing resources 504 in each of the data centers 404. It should be appreciated that the configuration of the data center 404 described with reference to FIG. 5 is merely illustrative and that other implementations can be utilized.

Figure 6:
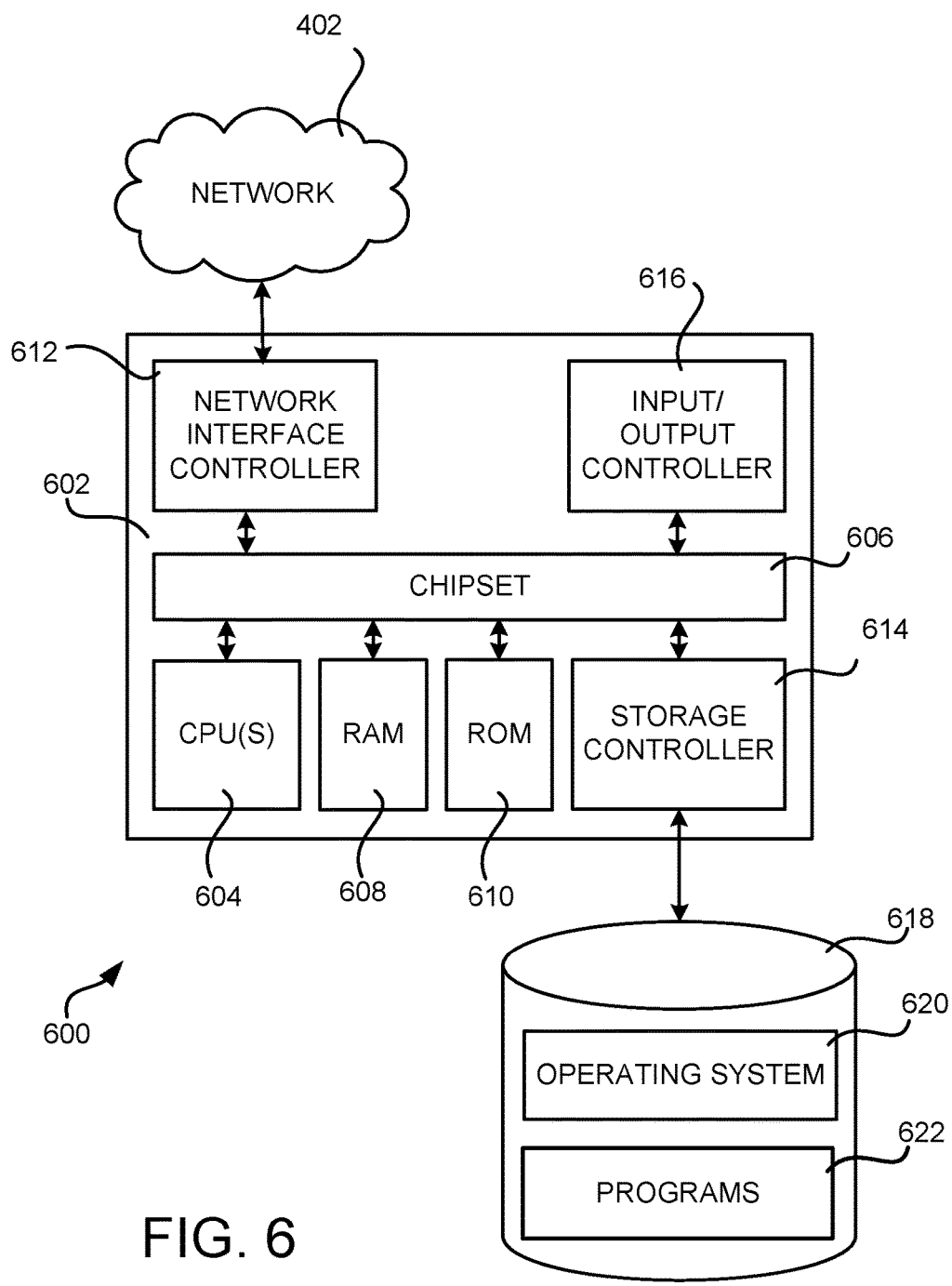
FIG. 6 is a computer architecture diagram showing an illustrative computer hardware architecture for implementing a computing device that can be utilized to implement aspects of the various technologies presented herein.

FIG. 6 shows an example computer architecture for a computer 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 402 shown in FIG. 4. The chipset 606 can include functionality for providing network connectivity through a NIC 612, such as a gigabit Ethernet adapter. The NIC 612 is capable of connecting the computer 600 to other computing devices over the network 608. It should be appreciated that multiple NICs 612 can be present in the computer 600, connecting the computer to other types of networks and remote computer systems.

The computer 600 can be connected to a mass storage device 618 that provides non-volatile storage for the computer. The mass storage device 618 can store an operating system 620, programs 622, and data, which have been described in greater detail herein. The mass storage device 618 can be connected to the computer 600 through a storage controller 614 connected to the chipset 606. The mass storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the mass storage device 618 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 618 is characterized as primary or secondary storage, and the like.

For example, the computer 600 can store information to the mass storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the mass storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 618 can store an operating system 620 utilized to control the operation of the computer 600. According to one configuration, the operating system comprises the LINUX operating system. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 618 can store other system or application programs and data utilized by the computer 600.

In one configuration, the mass storage device 618 or other computer-readable storage media is encoded with computer-executable instructions which, when loaded into the computer 600, transform the computer from a general-purpose computing system into a special-purpose computer capable of implementing the configurations described herein. These computer-executable instructions transform the computer 600 by specifying how the CPUs 604 transition between states, as described above. According to one configuration, the computer 600 has access to computer-readable storage media storing computer-executable instructions which, when executed by the computer 600, perform the various processes described above with regard to FIGS. 1-3B. The computer 600 can also include computer-readable storage media for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or another type of output device. It will be appreciated that the computer 600 might not include all of the components shown in FIG. 6, can include other components that are not explicitly shown in FIG. 6, or might utilize an architecture completely different than that shown in FIG. 6.

Based on the foregoing, it should be appreciated that technologies for providing a large scale data join service within a service provider network have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A computer-implemented method, comprising:
   obtaining a set of data files stored at a storage service within a service provider network, the set of data files comprising a first set of files and a second set of files that corresponds to the first set of files, each file within the first and second sets of files comprising a first identifier (ID) and a second ID;
   partitioning the first set of files based at least in part upon the first ID into a plurality of first subsets of files;
   partitioning the second set of files based at least in part upon the first ID into a plurality of second subsets of files;
   encoding, into a first bitset at a first memory location, each file within a first group of files of the plurality of first subsets of files to provide first bitsets, the encoding being based at least in part upon the second IDs of the files in the first group of files;
   encoding, into a second bitset at a second memory location, each file within a second group of files of the plurality of second subsets of files to provide second bitsets, the encoding being based at least in part upon the second IDs of the files in the second group of files;
   performing a first logical exclusive-or (XOR) operation on the first bitsets and the second bitsets;
   comparing first results of the first logical XOR operation; and
   based at least in part on the comparing the first results of the first logical XOR operation, determining that at least one of (i) a first file exists within the first set of files and a corresponding second file does not exist within the second set of files or (ii) a third file exists within the second set of files and a corresponding fourth file does not exist within the first set of files.

2. The computer-implemented method of claim 1, further comprising:
   encoding, into a third bitset at the first memory location, each file within a third group of files of the plurality of first subsets of files to provide third bitsets, the encoding being based at least in part upon the second IDs of the files in the third group of files;
   encoding, into a fourth bitset at the second memory location, each file within a fourth group of files of the plurality of second subsets of files to provide fourth bitsets, the encoding being based at least in part upon the second IDs of the files in the fourth group of files;
   performing a second logical XOR operation on the third bitsets and the fourth bitsets;
   comparing second results of the second logical XOR operation on the third bitsets and the fourth bitsets; and
   based at least in part on the comparing the second results of the second logical XOR operation on the third bitsets and the fourth bitsets, determining that at least one of (i) a fifth file exists within the first set of files and a corresponding sixth file does not exist within the second set of files or (ii) a seventh file exists within the second set of files and a corresponding eighth file does not exist within the first set of files.

3. The computer-implemented method of claim 1, wherein the first set of files comprises object content files and the second set of files comprises index files corresponding to the object content files.

4. The computer-implemented method of claim 1, wherein the first ID comprises a volume ID of the data files and the second ID comprises an item ID of the data files.

5. The computer-implemented method of claim 1, further comprising:
   encoding, into a third bitset at a third memory location, each file within a third group of files of the plurality of first subsets of files to provide third bitsets, the encoding being based at least in part upon the second IDs of the files in the third group of files;
encoding, into a fourth bitset at a fourth memory location, each file within a fourth group of files of the plurality of second subsets of files to provide fourth bitsets, the encoding being based at least in part upon the second IDs of the files in the fourth group of files;
performing a second logical XOR operation on the third bitsets and the fourth bitsets;
comparing second results of the second logical XOR operation on the third bitsets and the fourth bitsets; and
based at least in part on the comparing the second results of the second logical XOR operation on the third bitsets and the fourth bitsets, determining that at least one of (i) a fifth file exists within the first set of files and a corresponding sixth file does not exist within the second set of files or (ii) a seventh file exists within the second set of files and a corresponding eighth file does not exist within the first set of files.

6. The computer-implemented method of claim 5, wherein the operations of encoding into the first bitset, encoding into the second bitset and performing an XOR operation on the first bitset and the second bitset occur in parallel with the operations of encoding into the third bitset, encoding into the fourth bitset and performing an XOR operation on the third bitset and the fourth bitset.

7. A system, comprising:
one or more server computers hosting a network service configured to:
partition a first set of data files based at least in part upon a key into a plurality of first subsets of data files;
partition a second set of data files based at least in part upon the key into a plurality of second subsets of data files, wherein the second set of data files correspond to the first set of data files;
encode, into a first bitset at a first memory location, each data file within a first group of data files of the plurality of first subsets of data files to provide first bitsets, the encoding being based at least in part upon an item identifier (ID) of the data files in the first group of data files;
encode, into a second bitset at a second memory location, each data file within a second group of data files of the plurality of second subsets of data files to provide second bitsets, the encoding being based at least in part upon the item ID of the data files in the second group of data files;
compare the first bitsets with the second bitsets; and
based at least in part on results of the comparing the first bitsets with the second bitsets, determine that at least one of (i) a first data file exists within the first set of data files and a corresponding second data file does not exist within the second set of data files or (ii) a third data file exists within the second set of data files and a corresponding fourth data file does not exist within the first set of data files.

8. The system of claim 7, wherein the key comprises a volume ID of the data files.

9. The system of claim 7, wherein the network service is further configured to compare the first bitset with the second bitset using a logical exclusive-or (XOR) operation.

10. The system of claim 7, wherein the network service is further configured to:
encode, into a third bitset at the first memory location, each file within a third group of files of the plurality of first subsets of files to provide third bitsets, the encoding being based at least in part upon the item IDs of the files in the third group of files;
encode, into a fourth bitset at the second memory location, each file within a fourth group of files of the plurality of second subsets of files to provide fourth bitsets, the encoding being based at least in part upon the item IDs of the files in the fourth group of files;
compare the third bitsets with the fourth bitsets; and
based at least in part on results of the comparing the third bitsets with the fourth bitsets, determine that at least one of (i) a fifth file exists within the first set of files and a corresponding sixth file does not exist within the second set of files or (ii) a seventh file exists within the second set of files and a corresponding eighth file does not exist within the first set of files.

11. The system of claim 7, wherein the first set of files comprises data object content files and the second set of files comprises index files corresponding to the data object content files.

12. The system of claim 7, wherein the network service is further configured to:
encode, into a third bitset, each file within a third group of files of the plurality of first subsets of files to provide third bitsets, the encoding being based at least in part upon the item IDs of the files in the third group of files;
encode, into a fourth bitset, each file within a fourth group of files of the plurality of second subsets of files to provide fourth bitsets, the encoding being based at least in part upon the item IDs of the files in the fourth group of files;
compare the third bitsets with the fourth bitsets; and
based at least in part on results of the comparing the third bitsets with the fourth bitsets, determine that at least one of (i) a fifth file exists within the first set of files and a corresponding sixth file does not exist within the second set of files or (ii) a seventh file exists within the second set of files and a corresponding eighth file does not exist within the first set of files.

13. The system of claim 12, wherein the network service is further configured to perform the operations of encoding into the first bitset, encoding into the second bitset and comparing the first bitset with the second bitset in parallel with the operations of encoding into the third bitset, encoding into the fourth bitset and comparing the third bitset with the fourth bitset.

14. A computer-readable storage medium having computer-executable instructions stored thereupon which, when executed by one or more processors, cause the one or more processors to:
partition a first set of data files based at least in part upon a key into a plurality of first subsets of data files;
partition a second set of data files based at least in part upon the key into a plurality of second subsets of data files, wherein the second set of data files correspond to the first set of data files;
encode, into a first bitset at a first memory location, each data file within a first group of data files of the plurality of first subsets of data files to provide first bitsets, the encoding being based at least in part upon an item identifier (ID) of the data files in the first group of data files;
encode, into a second bitset at a second memory location, each data file within a second group of data files of the plurality of second subsets of data files to provide second bitsets, the encoding being based at least in part upon the item ID of the data files in the second group of data files;

compare the first bitsets with the second bitsets; and based at least in part on results of the comparing the first bitsets with the second bitsets, determine that at least one of (i) a first data file exists within the first set of data files and a corresponding second data file does not exist within the second set of data files or (ii) a third data file exists within the second set of data files and a corresponding fourth data file does not exist within the first set of data files.

15. The computer-readable storage medium of claim 14, wherein the key comprises a volume ID of the data files.

16. The computer-readable storage medium of claim 14, having further computer-executable instructions stored thereupon to compare the first bitsets with the second bitsets using a logical exclusive-or (XOR) operation.

17. The computer-readable storage medium of claim 14, having further computer-executable instructions stored thereupon to:

encode, into a third bitset at the first memory location, each file within a third group of files of the plurality of first subsets of files to provide third bitsets, the encoding being based at least in part upon the item IDs of the files in the third group of files;

encode, into a fourth bitset at the second memory location, each file within a fourth group of files of the plurality of second subsets of files to provide fourth bitsets, the encoding being based at least in part upon the item IDs of the files in the fourth group of files;

compare the third bitsets with the fourth bitsets; and based at least in part on results of the comparing the third bitsets with the fourth bitsets, determine that at least one of (i) a fifth data file exists within the first set of data files and a corresponding sixth data file does not exist within the second set of data files or (ii) a seventh data file exists within the second set of data files and a corresponding eighth data file does not exist within the first set of data files.

18. The computer-readable storage medium of claim 14, wherein the first set of files comprises data object content files and the second set of files comprises index files corresponding to the data object content files.

19. The computer-readable storage medium of claim 14, having further computer-executable instructions stored thereupon to:

encode, into a third bitset, each file within a third group of files of the plurality of first subsets of files to provide third bitsets, the encoding being based at least in part upon the item IDs of the files in the third group of files;

encode, into a fourth bitset, each file within a fourth group of files of the plurality of second subsets of files to provide fourth bitsets, the encoding being based at least in part upon the item IDs of the files in the fourth group of files; and compare the third bitsets with the fourth bitsets; and based at least in part on results of the comparing the third bitsets with the fourth bitsets, determine that at least one of (i) a fifth data file exists within the first set of data files and a corresponding sixth data file does not exist within the second set of data files or (ii) a seventh data file exists within the second set of data files and a corresponding eighth data file does not exist within the first set of data files.

20. The computer-readable storage medium of claim 19, wherein the operations of encoding into first bitsets, encoding into second bitsets and comparing the first bitsets with the second bitsets are performed in parallel with the operations of encoding into third bitsets, encoding into fourth bitsets and comparing the third bitsets with the fourth bitsets.

* * * * *